US012571315B2

(12) United States Patent
White, III

(10) Patent No.: US 12,571,315 B2
(45) Date of Patent: Mar. 10, 2026

(54) BLADE WITH DAMPER LAND

(71) Applicant: RAYTHEON TECHNOLOGIES CORPORATION, Farmington, CT (US)

(72) Inventor: Robert A. White, III, Meriden, CT (US)

(73) Assignee: RTX Corporation, Farmington, CT (US)

( * ) Notice: Subject to any disclaimer, the term of this patent is extended or adjusted under 35 U.S.C. 154(b) by 102 days.

(21) Appl. No.: 18/123,708

(22) Filed: Mar. 20, 2023

(65) Prior Publication Data

US 2024/0318559 A1 Sep. 26, 2024

(51) Int. Cl.
*F01D 5/16* (2006.01)
*F01D 5/28* (2006.01)

(52) U.S. Cl.
CPC ............... *F01D 5/16* (2013.01); *F01D 5/282* (2013.01); *F05D 2230/10* (2013.01); *F05D 2230/312* (2013.01); *F05D 2260/96* (2013.01); *F05D 2300/6033* (2013.01)

(58) Field of Classification Search
CPC .......... F01D 5/16; F01D 25/164; F01D 5/282; F01D 25/04; F01D 5/10
See application file for complete search history.

(56) References Cited

U.S. PATENT DOCUMENTS

| | | | | |
|---|---|---|---|---|
| 6,648,597 | B1 * | 11/2003 | Widrig | F01D 9/044 415/200 |
| 7,121,800 | B2 * | 10/2006 | Beattie | F01D 5/22 416/193 A |
| 7,250,224 | B2 | 7/2007 | Darolia et al. | |
| 10,196,896 | B2 * | 2/2019 | Bryant | F01D 5/10 |
| 10,202,853 | B2 * | 2/2019 | Kleinow | F01D 5/147 |
| 10,465,534 | B2 | 11/2019 | Freeman et al. | |
| 10,472,976 | B2 | 11/2019 | Freeman et al. | |
| 11,143,040 | B2 | 10/2021 | McCaffrey et al. | |
| 2013/0064668 | A1 | 3/2013 | Paige, II et al. | |
| 2016/0298457 | A1 * | 10/2016 | Edwards | F01D 5/10 |
| 2022/0112810 | A1 * | 4/2022 | Tomii | F04D 29/668 |

(Continued)

FOREIGN PATENT DOCUMENTS

| | | |
|---|---|---|
| CN | 102797509 | 9/2014 |
| EP | 4206439 A1 | 7/2023 |

(Continued)

OTHER PUBLICATIONS

Shiraishi, JP 2019173659A English Translation (Year: 2019).*

(Continued)

*Primary Examiner* — Michael L Sehn
(74) *Attorney, Agent, or Firm* — Carlson, Gaskey & Olds, P.C.

(57) ABSTRACT

A gas turbine engine blade includes a platform; an airfoil section extending from the platform in a first direction; a mount extending from the platform in a second direction opposite the first direction; a damper land on the platform, the damper land having a relatively smoother outward-facing surface than the platform; and a damper interfacing with the outward-facing surface of the damper land. A method of making a gas turbine engine blade is also disclosed.

17 Claims, 2 Drawing Sheets

(56) References Cited

U.S. PATENT DOCUMENTS

| | | | |
|---|---|---|---|
| 2022/0169574 | A1 | 6/2022 | Shim et al. |

FOREIGN PATENT DOCUMENTS

| | | | |
|---|---|---|---|
| JP | 2012180764 | | 9/2012 |
| JP | 2019173659 | A | 10/2019 |

OTHER PUBLICATIONS

Kumar, Ch.S., Majumder, H., Khan, A., Patel, S.K. (2020), Applicability of DLC and WC/C low friction coatings on Al2O3/TiCN mixed ceramic cutting tools for dry machining of hardended 52100 steel. Ceramics International vol. 46, No. 8, pp. 11889-11897, Jan. 26, 2020.

European Search Report for EP Application No. 24164649.6 dated Apr. 23, 2024.

* cited by examiner

BLADE WITH DAMPER LAND

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Various areas of the gas turbine engine include blades, such as the turbine section. In some examples the blades are ceramic matrix composite ("CMC") blades, which have certain benefits for high-temperature applications such as in the turbine of a gas turbine engine. There is a need for improving the properties of CMC blades.

SUMMARY OF THE INVENTION

A gas turbine engine blade according to an exemplary embodiment of this disclosure, among other possible things includes a platform; an airfoil section extending from the platform in a first direction; a mount extending from the platform in a second direction opposite the first direction; a damper land on the platform, the damper land having a relatively smoother outward-facing surface than the platform; and a damper interfacing with the outward-facing surface of the damper land.

In a further example of the foregoing, the damper land includes at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, silicon nitride, silicon-aluminum-oxygen-nitrogen, barium-magnesium aluminosilicate, hafnium oxides such as hafnon, hafnium silicon oxides, alumina-stabilized zirconia, zirconium oxides such as zircon, yttrium oxides such as yttria, and combinations thereof.

In a further example of any of the foregoing, the damper land includes at least one of hafnon, zircon, and mullite.

In a further example of any of the foregoing, the blade is one of a ceramic matrix composite blade or a monolithic ceramic blade.

In a further example of any of the foregoing, the damper is on a non-gas-path surface of the platform.

In a further example of any of the foregoing, the damper land is on a leading edge side of the platform.

In a further example of any of the foregoing, the damper land is on a trailing edge side of the platform.

In a further example of any of the foregoing, the damper land is on a pressure side of the platform.

In a further example of any of the foregoing, the damper land is on a suction side of the platform.

In a further example of any of the foregoing, a surface roughness of the outwardly-facing surface of the damper land is less than about 100 ra (microinches).

In a further example of any of the foregoing, a surface roughness of the outwardly-facing surface of the damper land is between about 20 and about 100 ra (microinches).

In a further example of any of the foregoing, a surface roughness of the outwardly-facing surface of the damper land is less than about 65 ra (microinches).

A method of making a gas turbine engine blade according to an exemplary embodiment of this disclosure, among other possible things includes applying a damper land to a platform of the gas turbine engine blade. The gas turbine engine blade includes an airfoil section extending from the platform in a first direction and a mount extending from the platform in a second direction opposite the first direction. The outwardly-facing surface of the damper land is configured to interface with a damper.

In a further example of the foregoing, the damper land includes at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, silicon nitride, silicon-aluminum oxygen-nitrogen, barium-magnesium aluminosilicate, hafnium oxides such as hafnon, hafnium silicon oxides, alumina-stabilized zirconia, zirconium oxides such as zircon, yttrium oxides such as yttria, and combinations thereof.

In a further example of any of the foregoing, the applying is by one of air plasma spraying, slurry infiltration, and melt infiltration.

In a further example of any of the foregoing, the method also includes machining the outwardly-facing surface of the damper land after the applying.

In a further example of any of the foregoing, the machining is by one of grinding, ultrasonic machining, water guided laser, milling, and reaming.

In a further example of any of the foregoing, a surface roughness of the outwardly-facing surface of the damper land is less than about 100 ra (microinches) after the machining.

In a further example of any of the foregoing, a surface roughness of the outwardly-facing surface of the damper land is between about 20 and about 100 ra (microinches) after the machining.

In a further example of any of the foregoing, a surface roughness of the outwardly-facing surface of the damper land is less than about 65 ra (microinches) after the machining.

DETAILED DESCRIPTION

Figure 1:
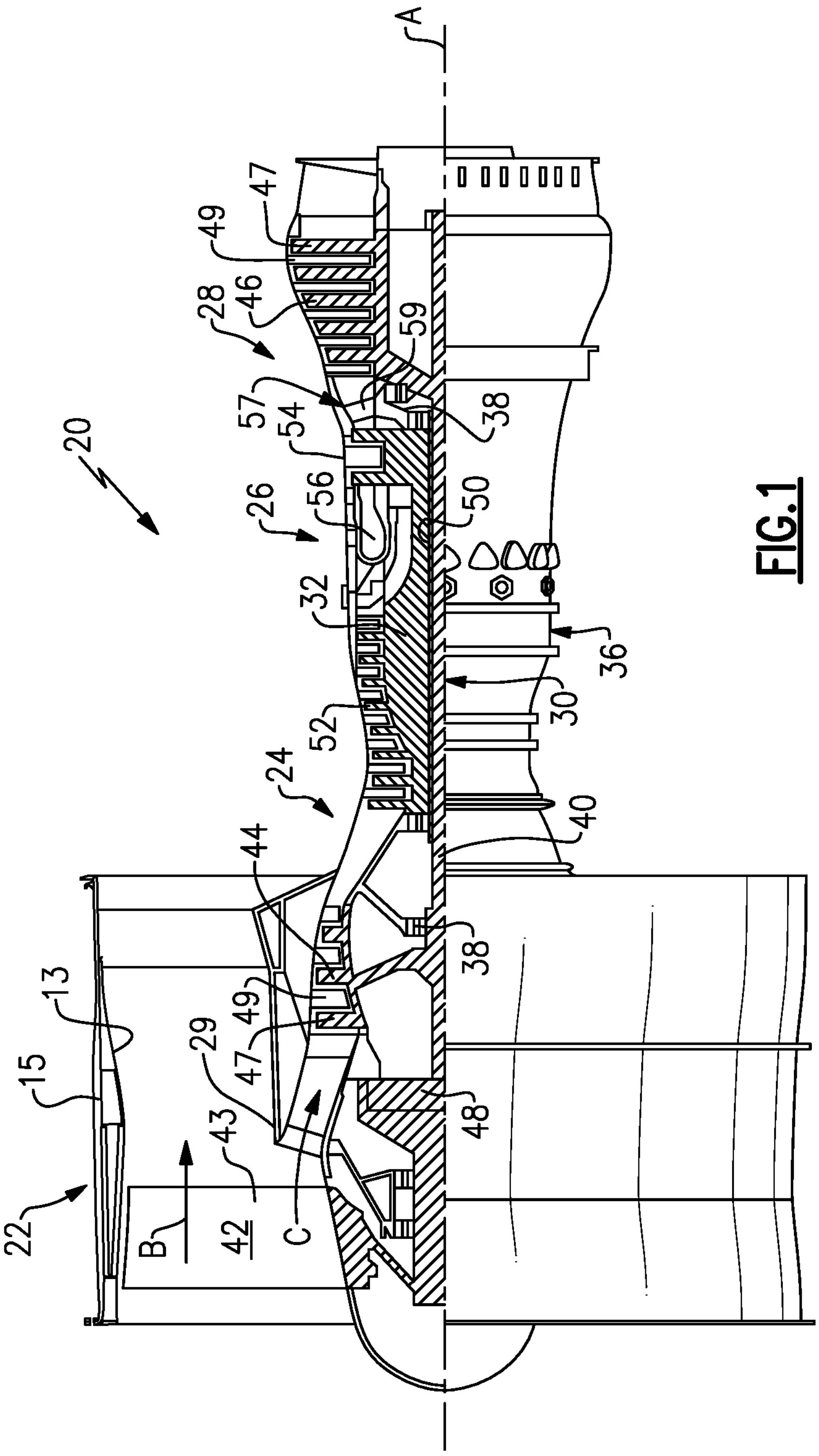
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path Cis compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram}\ {}^\circ\ \text{R})/(518.7^\circ\ \text{R})]^{0.5}$. The corrected fan tip speed can be less than or equal to 1150.0 ft/second (350.5 meters/second), and can be greater than or equal to 1000.0 ft/second (304.8 meters/second).

Various areas of the engine 20 include seals. For instance, the turbine section 28 may include seals between adjacent platforms of the vanes of the rows of vanes. As another example, the turbine section 28 may include seals between tips of the blades in the rows of blades and engine 20 casing structures, known as blade outer air seals (BOAS), blade tip seals, or bucket tracks. Other examples are also contemplated.

Figure 2A:
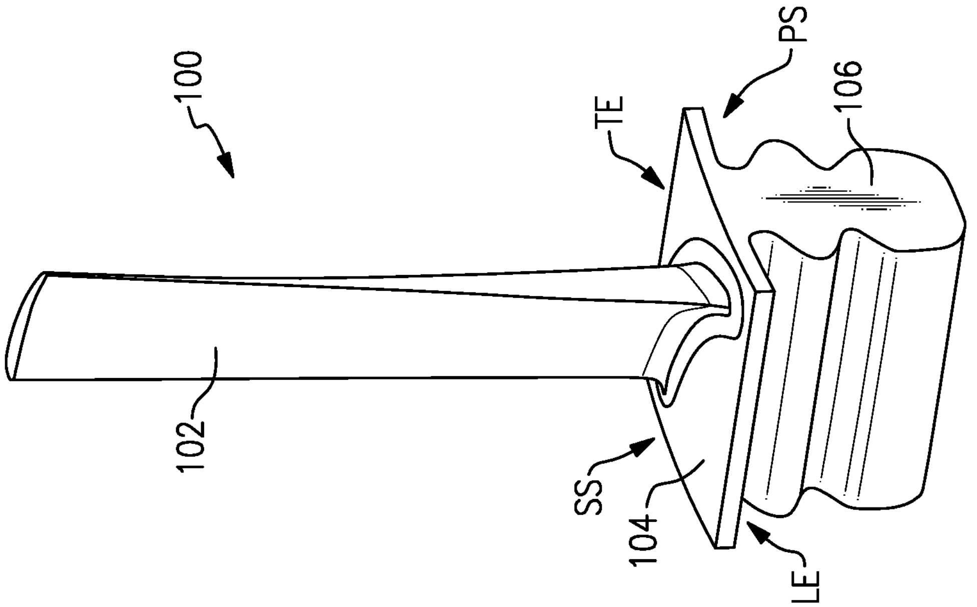
FIGS. 2A-B schematically illustrate an example blade for the gas turbine engine of FIG. 1 with a damper land.
Figure 2B:
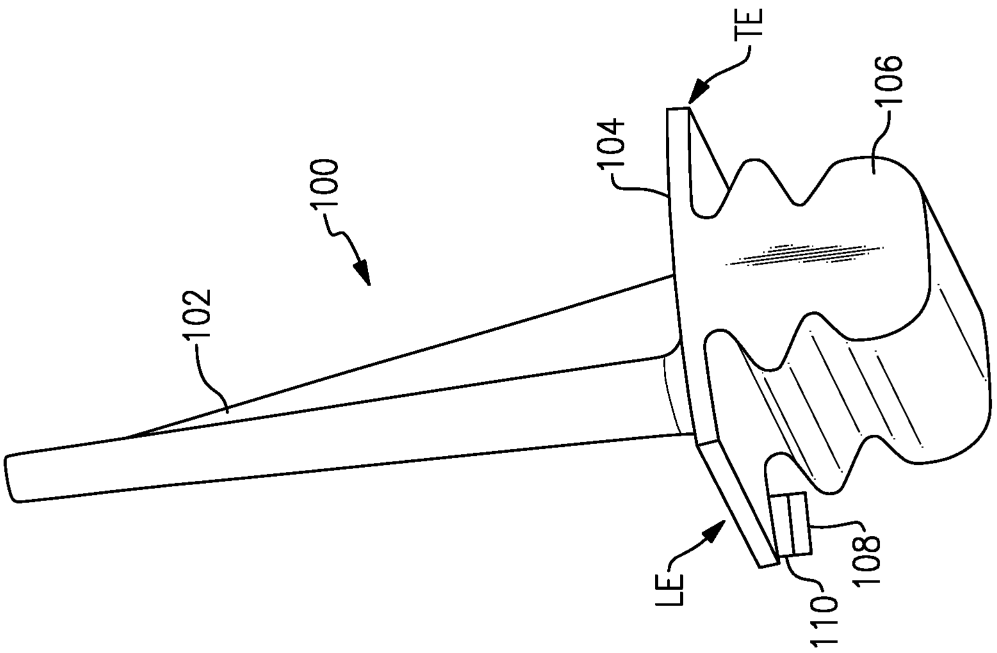

FIGS. 2A-B shows an example blade 100 that can be used in, for example, the turbine section 28 of the engine 20. The blade 100 includes an airfoil section 102 that extends from a platform 104, and a mount 106 extending from the platform 104 in a direction opposite the direction of the airfoil section 102. In this example the mount 106 is a "fir-tree" mount though other geometries are contemplated. In general, the mount 106 has enlarged portions that are received in corresponding grooves of a rotor disk in a turbine 46/54 of the turbine section 28 to retain the blade 100 in the rotor disk (not shown).

The blades 100 are formed of a ceramic matrix composite (CMC) material which may be comprised of one or more ceramic reinforcements, such as fibers, in a ceramic matrix. Example of ceramic matrices are silicon-containing ceramics, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SIC) fiber or silicon nitride (Si3N4) fibers. The CMC may be, but is not limited to, a SiC/SiC ceramic matrix composite in which SiC fiber plies are disposed within a SiC matrix. The fibers may be arranged in fiber plies, is an ordered arrangement of the fiber tows/yarns relative to one another, such as a 2D/3D weave, braid, knit, or a nonwoven structure.

CMCs are desirable for use in blades 100 because they have higher temperature capabilities relative to their metallic counterparts. However, untreated ceramic matrix composites can have poorer surface qualities than their metallic counterparts because of undulations corresponding to the reinforcements at the surface (commonly known as crimp), residual open porosity remaining after infiltrating the matrix material into the reinforcements, and inherent surface roughnesses of the matrix and/or fiber reinforcements.

During operation of the engine 20, the blade 100 may be subject to vibratory forces. A damper 108 is attached to the blade 100 to damp these vibratory forces. However, the surface roughness of the CMC blade 100 discussed above can interfere with a smooth attachment between the damper 108 and the blade 100 (FIG. 2B). Accordingly, a damper land 110 is provided on the blade 100 and interfaces with the damper 108. In a particular example, the damper land 110 is located on the non-gas-path, or radially inner, surface of the platform 104 with respect to the engine axis A. That is, the damper land is arranged on the surface of the platform 104 from which the mount 106 extends. The damper land 110 may be on a leading edge (LE) side of the platform 104, a trailing edge (TE) side of the platform 104, a pressure side (PS) of the platform, a suction side (SS) of the platform, or a combination thereof.

The damper land 110 has a relatively smoother outward-facing surface than the CMC blade 100 and therefore provides a relatively smoother landing for the damper 108. The smoother landing facilitates more efficient transfer and control of vibratory forces experienced by the blade 100.

The damper land 110 comprises a machinable material. The material may include includes rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof. In a particular example, the machinable coating includes at least one of hafnon, zircon, and mullite.

The damper land 110 may be applied to the blade 100 in any suitable way known in the art, such as air plasma spraying, slurry infiltration and sintering, or melt infiltration by liquid silicon, glass, or glass ceramic.

The damper land 110 is cured, dried, heat treated, and/or processed according to its makeup and application method, which are well-known in the art.

The damper land 110 and in particular its outwardly facing surface is then machined via grinding, ultrasonic machining, water guided laser, milling, reaming, or another suitable method. In general, the machining includes removing material of the damper land 110 until the desired profile and geometry is achieved.

After machining, the damper land 110 has a smooth surface. In example, the damper land 110 has a surface roughness less than about 100 ra (microinches). In another example, the surface roughness of the damper land 110 is between about 20 and 100 ra. In another example, the surface roughness of the damper land 110 is less than about 65 ra.

As used herein, the term "about" has the typical meaning in the art, however in a particular example "about" can mean deviations of up to 10% of the values described herein.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine blade, comprising:
- a platform;
- an airfoil section extending from the platform in a first direction;
- a mount extending from the platform in a second direction opposite the first direction;
- a damper land fixed on the platform, the damper land having a relatively smoother outward-facing surface than the platform;
- a damper interfacing with the outward-facing surface of the damper land;
- wherein the blade is one of a ceramic matrix composite blade or a monolithic ceramic blade; and
- the damper land extending beyond an inner surface of the platform, and in the second direction.

2. The gas turbine engine blade of claim 1, wherein the damper land includes at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, silicon nitride, silicon-aluminum-oxygen-nitrogen, barium-magnesium aluminosilicate, hafnium oxides such as hafnon, hafnium-silicon oxides, alumina-stabilized zirconia, zirconium oxides including zircon, yttrium oxides such as yttria, and combinations thereof.

3. The gas turbine engine blade of claim 2, wherein the damper land includes at least one of hafnon, zircon, and mullite.

4. The gas turbine engine blade of claim 1, wherein the damper is on a non-gas-path surface of the platform.

5. The gas turbine engine blade of claim 4, wherein the damper land is on a leading edge side of the platform.

6. The gas turbine engine blade of claim 4, wherein the damper land is on a trailing edge side of the platform.

7. The gas turbine engine blade of claim 4, wherein the damper land is on a pressure side of the platform.

8. The gas turbine engine blade of claim 4, wherein the damper land is on a suction side of the platform.

9. The gas turbine engine blade of claim 1, wherein a surface roughness of the outwardly-facing surface of the damper land is less than 100 ra (microinches).

10. The gas turbine engine blade of claim 9, wherein a surface roughness of the outwardly-facing surface of the damper land is between 20 and 100 ra (microinches).

11. The gas turbine engine blade of claim 9, wherein a surface roughness of the outwardly-facing surface of the damper land is less than 65 ra (microinches).

12. A method of making a gas turbine engine blade, comprising:

applying a damper land to a platform of the gas turbine engine blade, the gas turbine engine blade including an airfoil section extending from the platform in a first direction and a mount extending from an inner surface of the platform in a second direction opposite the first direction, and the damper land extending beyond the inner surface of the platform in the second direction wherein an outwardly-facing surface of the damper land is configured to interface with a damper;

where the applying step is by one of air plasma spraying, slurry infiltration, and melt infiltration;

further comprising machining the outwardly-facing surface of the damper land after the applying; and wherein the gas turbine engine blade is formed of one of a ceramic matrix composite or a monolithic ceramic, with the machining step resulting in the damper land having a relatively smoother outwardly-facing surface than the platform.

13. The method of claim 12, wherein the damper land includes at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, silicon nitride, silicon-aluminum oxygen-nitrogen, barium-magnesium aluminosilicate, hafnium oxides such as hafnon, hafnium-silicon oxides, alumina-stabilized zirconia, zirconium oxides such as zircon, yttrium oxides including yttria, and combinations thereof.

14. The method of claim 12, wherein the machining is by one of grinding, ultrasonic machining, water-guided laser, milling, and reaming.

15. The method of claim 12, wherein a surface roughness of the outwardly-facing surface of the damper land is less than 100 ra (microinches) after the machining.

16. The method of claim 15, wherein a surface roughness of the outwardly-facing surface of the damper land is between about 20 and 100 ra (microinches) after the machining.

17. The method of claim 15, wherein a surface roughness of the outwardly-facing surface of the damper land is less than 65 ra (microinches) after the machining.

* * * * *